United States Patent
Lashkari et al.

(10) Patent No.: US 12,128,892 B2
(45) Date of Patent: Oct. 29, 2024

(54) OPTIMAL PULL OVER PLANNING UPON EMERGENCY VEHICLE SIREN DETECTION

(71) Applicant: GM GLOBAL TECHNOLOGY OPERATIONS LLC, Detroit, MI (US)

(72) Inventors: Negin Lashkari, Markham (CA); Tooba Ahmad Sheikh, Thornhill (CA); Thiago Campos Gondim Martins Coelho, Stouffville (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 252 days.

(21) Appl. No.: 17/806,298

(22) Filed: Jun. 10, 2022

(65) Prior Publication Data

US 2023/0398985 A1  Dec. 14, 2023

(51) Int. Cl.
*B60W 30/095* (2012.01)
*B60W 50/14* (2020.01)

(52) U.S. Cl.
CPC ........ *B60W 30/0956* (2013.01); *B60W 50/14* (2013.01); *B60W 2050/146* (2013.01); *B60W 2420/403* (2013.01); *B60W 2420/54* (2013.01); *B60W 2554/402* (2020.02); *B60W 2555/60* (2020.02); *B60W 2556/40* (2020.02)

(58) Field of Classification Search
CPC ............. B60W 30/0956; B60W 50/14; B60W 2050/146; B60W 2420/403; B60W 2420/54; B60W 2554/402; B60W 2555/60; B60W 2556/40
USPC .......................................................... 701/26
See application file for complete search history.

(56) References Cited

U.S. PATENT DOCUMENTS

| | | | |
|---|---|---|---|
| 10,569,707 B1* | 2/2020 | Adam ................... B60Q 9/00 |
| 11,288,612 B2* | 3/2022 | Kislovskiy ............ G08G 1/202 |
| 2016/0098926 A1* | 4/2016 | Probert .................. G01S 11/02 340/903 |
| 2017/0192429 A1* | 7/2017 | Tseng ..................... G08G 1/00 |
| 2018/0096595 A1* | 4/2018 | Janzen ................... G06V 10/94 |
| 2018/0299887 A1* | 10/2018 | Cashler ............ B60W 30/18163 |
| 2018/0340790 A1* | 11/2018 | Kislovskiy ......... G01C 21/3484 |
| 2019/0187719 A1* | 6/2019 | El-Khatib .............. G08G 1/167 |
| 2021/0001877 A1* | 1/2021 | Han ..................... B60W 60/001 |
| 2021/0004610 A1* | 1/2021 | Huang ................... G01S 7/4814 |
| 2021/0101624 A1* | 4/2021 | Philbin ................ G06F 18/251 |
| 2021/0157330 A1* | 5/2021 | Tran ..................... G06V 20/588 |
| 2021/0347383 A1* | 11/2021 | Siebert .............. G01C 21/3407 |

(Continued)

*Primary Examiner* — Andrew R Dyer
(74) *Attorney, Agent, or Firm* — Lorenz & Kopf LLP

(57) ABSTRACT

Methods and systems are provided that include: obtaining sensor data pertaining to a roadway in which a host vehicle and an emergency vehicle are both travelling; generating, using map data pertaining to the roadway, a grid of a plurality of potential cells along the roadway for the host vehicle to pull over to yield right of way to the emergency vehicle; prioritizing, via a processor of the host vehicle, the plurality of potential cells based on a plurality of different criteria as to conditions of the host vehicle and the roadway; selecting, via the processor, one of the plurality of potential cells as an optimal pull over location for the host vehicle along the roadway, based on the prioritizing of the plurality of cells; and taking a vehicle action for the host vehicle, in accordance with instructions provided by the processor, with respect to the optimal pull over location.

18 Claims, 6 Drawing Sheets

(56) References Cited

U.S. PATENT DOCUMENTS

2022/0114406 A1* 4/2022 Wyffels ............. G06F 18/24155
2022/0340130 A1* 10/2022 Motoyama ........... G08G 1/0965

* cited by examiner

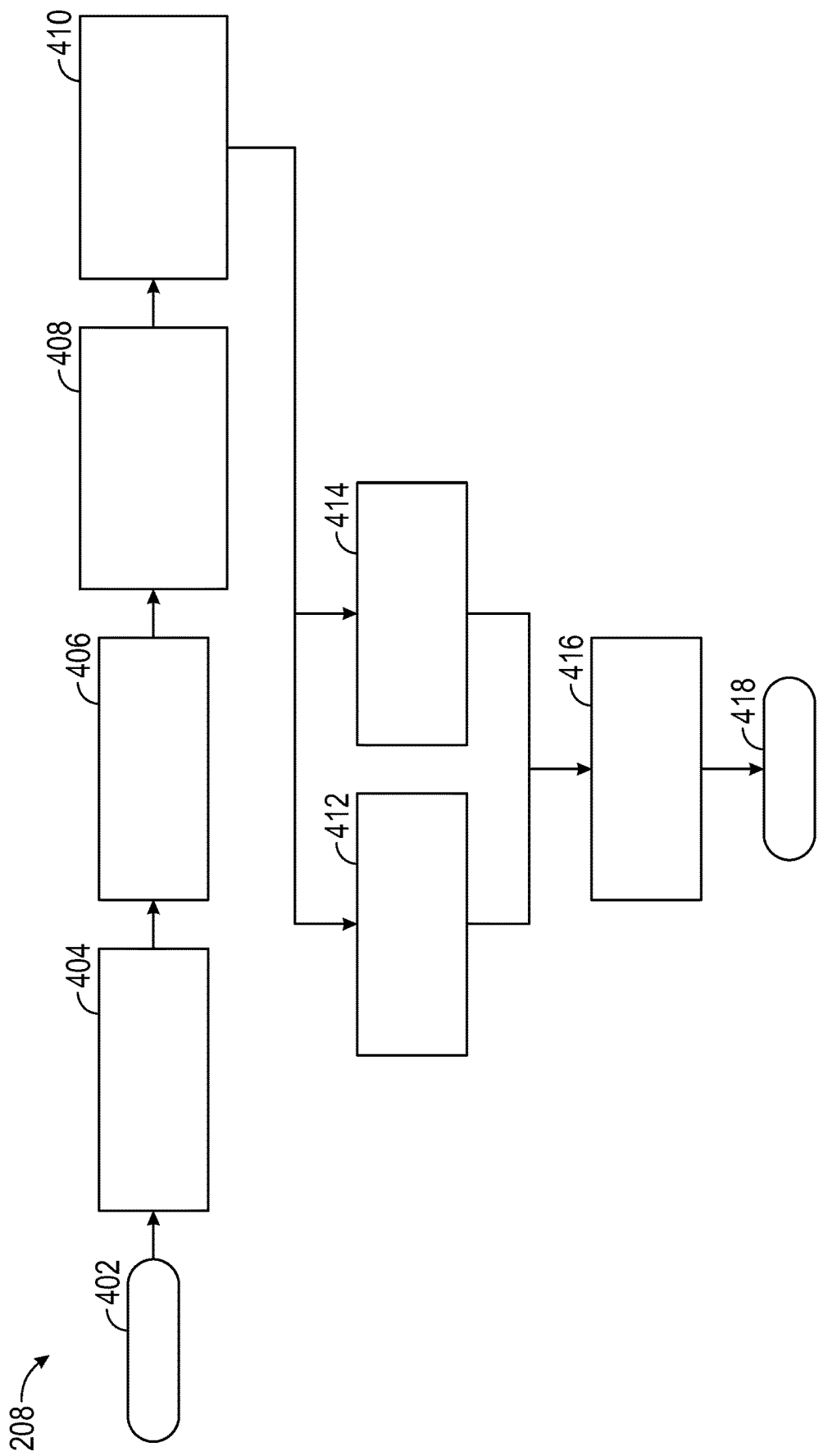

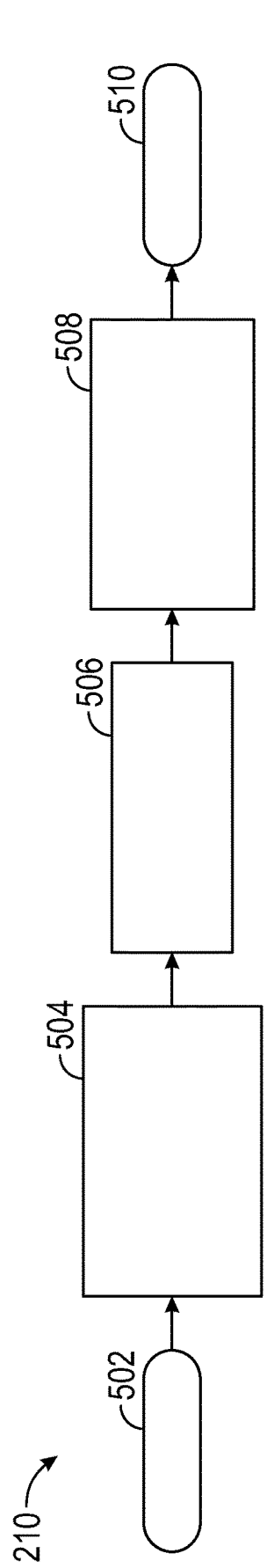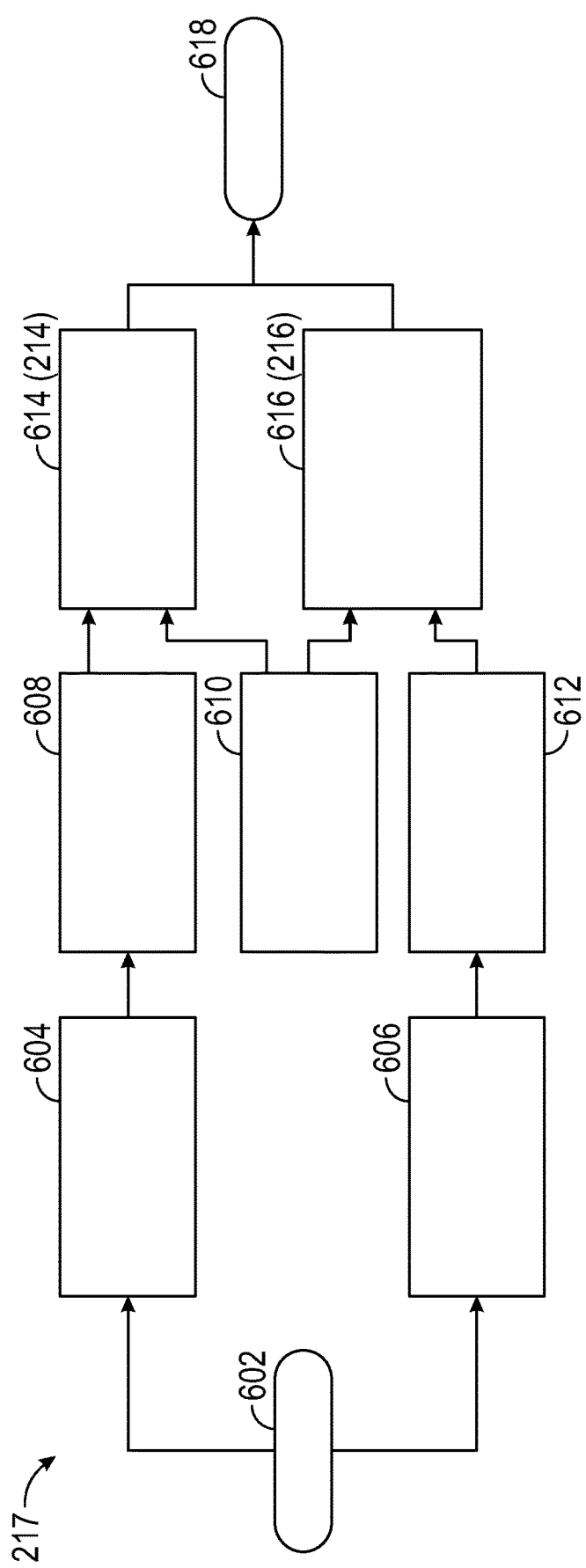

OPTIMAL PULL OVER PLANNING UPON EMERGENCY VEHICLE SIREN DETECTION

TECHNICAL FIELD

The technical field generally relates to vehicles and, more specifically, to methods and systems for planning vehicle pull over actions after detection of emergency vehicle sirens.

BACKGROUND

Vehicles today generally need to yield the right of way to emergency vehicles on the road. Often vehicles pull over to the right when an emergency vehicle is nearby. However, this may not always be the optimal solution, for example depending on the proximity of the host vehicle, the emergency vehicle, and traffic patterns on the road.

Accordingly, it is desirable to provide improved methods and systems for planning vehicle pull over events upon detection of an emergency vehicle. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes: obtaining sensor data pertaining to a roadway in which a host vehicle and an emergency vehicle are both travelling; generating, using map data pertaining to the roadway, a grid of a plurality of potential cells along the roadway for the host vehicle to pull over to yield right of way to the emergency vehicle; prioritizing, via a processor of the host vehicle, the plurality of potential cells based on a plurality of different criteria as to conditions of the host vehicle and the roadway; selecting, via the processor, one of the plurality of potential cells as an optimal pull over location for the host vehicle along the roadway, based on the prioritizing of the plurality of cells; and taking a vehicle action for the host vehicle, in accordance with instructions provided by the processor, with respect to the optimal pull over location.

Also in an exemplary embodiment, the step of taking the vehicle action includes automatically moving the host vehicle to the optimal pull over location in accordance with instructions provided by the processor to one or more vehicle systems of the host vehicle.

Also in an exemplary embodiment, the step of taking the vehicle action includes providing a display of the optimal pull over location for a driver of the host vehicle, via a display device of the host vehicle in accordance with instructions provided by the processor.

Also in an exemplary embodiment, the step of obtaining sensor data includes: obtaining microphone data from one or more microphones of the host vehicle; and obtaining vision data from one or more cameras of the host vehicle; and the method further includes: detecting the emergency vehicle using the microphone data; and localizing the emergency vehicle using the vision data.

Also in an exemplary embodiment, the steps of prioritizing the plurality of potential cells and selecting the optimal pull over location are both performed via the processor using respective probabilities for each potential cell as to whether the host vehicle can successfully reach the potential cell while following road rules for the roadway.

Also in an exemplary embodiment, the steps of prioritizing the plurality of potential cells and selecting the optimal pull over location are both performed via the processor using respective probabilities for each potential cell as to whether the host vehicle can successfully reach the potential cell while following traffic in front of the host vehicle.

Also in an exemplary embodiment, the steps of prioritizing the plurality of potential cells and selecting the optimal pull over location are both performed via the processor using respective probabilities for each potential cell as to whether the host vehicle can successfully reach the potential cell while given vehicle dynamic constraints.

Also in an exemplary embodiment, the steps of prioritizing the plurality of potential cells and selecting the optimal pull over location are both performed via the processor using respective probabilities for each potential cell as to whether the host vehicle can successfully reach the potential cell without contacting any other vehicles on the roadway.

Also in an exemplary embodiment, the steps of prioritizing the plurality of potential cells and selecting the optimal pull over location are both performed via the processor using respective probabilities for each potential cell as to whether the host vehicle can successfully reach the potential cell without the emergency vehicle being in the potential cell.

Also in an exemplary embodiment, the steps of prioritizing the plurality of potential cells and selecting the optimal pull over location are both performed via the processor using different respective probabilities for each potential cell as to each of the following: whether the host vehicle can successfully reach the potential cell while following road rules for the roadway; whether the host vehicle can successfully reach the potential cell while following traffic in front of the host vehicle; whether the host vehicle can successfully reach the potential cell while given vehicle dynamic constraints; whether the host vehicle can successfully reach the potential cell without contacting any other vehicles on the roadway; and whether the host vehicle can successfully reach the potential cell without the emergency vehicle being in the potential cell.

In another exemplary embodiment, a system is provided that includes: one or more sensors configured to generate sensor data pertaining to a roadway in which a host vehicle and an emergency vehicle are both travelling; and a processor that is coupled to the one or more sensors and configured to at least facilitate: generating, using map data pertaining to the roadway, a grid of a plurality of potential cells along the roadway for the host vehicle to pull over to yield right of way to the emergency vehicle; prioritizing the plurality of potential cells based on a plurality of different criteria as to conditions of the host vehicle and the roadway; selecting one of the plurality of potential cells as an optimal pull over location for the host vehicle along the roadway, based on the prioritizing of the plurality of cells; and taking a vehicle action for the host vehicle, in accordance with instructions provided by the processor, with respect to the optimal pull over location.

Also in an exemplary embodiment, the processor is further configured to at least facilitate automatically moving the host vehicle to the optimal pull over location in accordance with instructions provided by the processor to one or more vehicle systems of the host vehicle.

Also in an exemplary embodiment, the processor is further configured to at least facilitate providing a display of the optimal pull over location for a driver of the host vehicle, via a display device of the host vehicle in accordance with instructions provided by the processor.

Also in an exemplary embodiment, the one or more sensors include: one or more microphones configured to generate microphone data; and one or more cameras configured to generate vision data; and the processor is further configured to at least facilitate: detecting the emergency vehicle using the microphone data; and localizing the emergency vehicle using the vision data.

Also in an exemplary embodiment, the processor is further configured to at least facilitate prioritizing the plurality of potential cells and selecting the optimal pull over location using respective probabilities for each potential cell as to whether the host vehicle can successfully reach the potential cell while following road rules for the roadway.

Also in an exemplary embodiment, the processor is further configured to at least facilitate prioritizing the plurality of potential cells and selecting the optimal pull over location using respective probabilities for each potential cell as to whether the host vehicle can successfully reach the potential cell while following traffic in front of the host vehicle.

Also in an exemplary embodiment, the processor is further configured to at least facilitate prioritizing the plurality of potential cells and selecting the optimal pull over location using respective probabilities for each potential cell as to whether the host vehicle can successfully reach the potential cell while given vehicle dynamic constraints.

Also in an exemplary embodiment, the processor is further configured to at least facilitate prioritizing the plurality of potential cells and selecting the optimal pull over location using respective probabilities for each potential cell as to whether the host vehicle can successfully reach the potential cell without contacting the emergency vehicle or any other vehicles on the roadway.

Also in an exemplary embodiment, the processor is further configured to at least facilitate prioritizing the plurality of potential cells and selecting the optimal pull over location using different respective probabilities for each potential cell as to each of the following: whether the host vehicle can successfully reach the potential cell while following road rules for the roadway; whether the host vehicle can successfully reach the potential cell while following traffic in front of the host vehicle; whether the host vehicle can successfully reach the potential cell while given vehicle dynamic constraints; and whether the host vehicle can successfully reach the potential cell without contacting the emergency vehicle or any other vehicles on the roadway.

In another exemplary embodiment, a vehicle is provided that includes: a body; a propulsion system configured to generate movement of the body; one or more sensors configured to generate sensor data pertaining to a roadway in which a host vehicle and an emergency vehicle are both travelling; and a processor. The processor is coupled to the one or more sensors, and is configured to at least facilitate: generating, using map data pertaining to the roadway, a grid of a plurality of potential cells along the roadway for the host vehicle to pull over to yield right of way to the emergency vehicle; prioritizing the plurality of potential cells based on a plurality of different criteria as to conditions of the host vehicle and the roadway; selecting one of the plurality of potential cells as an optimal pull over location for the host vehicle along the roadway, based on the prioritizing of the plurality of cells; and taking a vehicle action for the host vehicle, in accordance with instructions provided by the processor, with respect to movement of the body of the host vehicle the optimal pull over location.

DESCRIPTION OF THE DRAWINGS

The present disclosure will hereinafter be described in conjunction with the following drawing figures, wherein like numerals denote like elements, and wherein:

FIG. 4 is a flowchart of a another exemplary step of the process of FIG. 2, namely, estimating a probability of achieving particular cells considering rules and regulations, in accordance with exemplary embodiments;

FIG. 5 is a flowchart of a another exemplary step of the process of FIG. 2, namely, estimating a probability of achieving particular cells with regards to following traffic and a front vehicle for the host vehicle, in accordance with exemplary embodiments;

FIG. 6 is a flowchart of other exemplary steps of the process of FIG. 2, namely, estimating a probability of reaching a particular cell without contacting another vehicle; and estimating a probability of reaching a particular cell without the emergency vehicle being in the particular cell, in accordance with exemplary embodiments.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
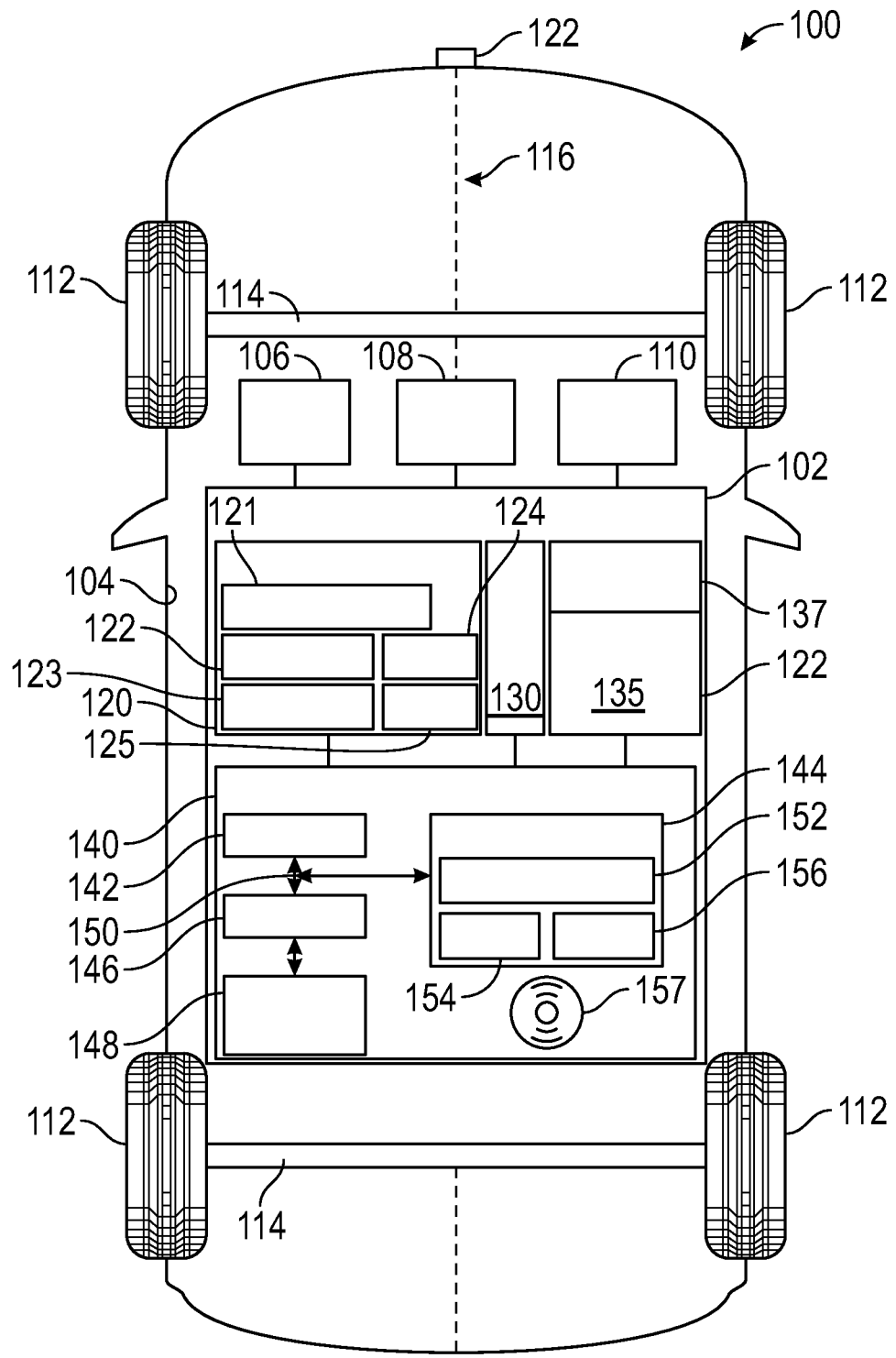
FIG. 1 is a functional block diagram of a vehicle having a control system for controlling vehicle pull over events upon detection of an emergency vehicle, in accordance with exemplary embodiments.

FIG. 1 illustrates a vehicle 100. In various embodiments, and as described below, the vehicle 100 includes a control system 102 for controlling various functions of the vehicle 100, including pulling over of the vehicle 100 when an emergency vehicle is detected, in accordance with exemplary embodiments. In various embodiments, the vehicle 100 may also be referred to herein as a "host vehicle" (e.g. as differentiation from additional vehicles, which also may be referenced as "other vehicles" or "target vehicles", on the roadway).

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, such as aircraft, spacecraft, watercraft, and so on, and/or one or more other types of mobile platforms (e.g., a robot and/or other mobile platform).

In certain embodiments, the vehicle 100 may comprise an autonomous or semi-autonomous vehicle, for example in which vehicle control (including pulling over of the vehicle 100 upon detection of an emergency vehicle) is automatically planned and executed by the control system 102, in whole or in part. In certain other embodiments, the vehicle 100 may be operated by a human driver, and in which the control system 102 may provide instructions or suggestions for the human driver for pulling over of the vehicle 100 upon detection of an emergency vehicle.

The vehicle 100 includes a body 104 that is arranged on a chassis 116. The body 104 substantially encloses other components of the vehicle 100. The body 104 and the chassis 116 may jointly form a frame. The vehicle 100 also includes a plurality of wheels 112. The wheels 112 are each rotationally coupled to the chassis 116 near a respective corner of the body 104 to facilitate movement of the vehicle 100. In one embodiment, the vehicle 100 includes four wheels 112, although this may vary in other embodiments (for example for trucks and certain other vehicles).

A drive system 110 is mounted on the chassis 116, and drives the wheels 112, for example via axles 114. The drive system 110 preferably comprises a propulsion system. In certain exemplary embodiments, the drive system 110 comprises an internal combustion engine and/or an electric motor/generator, coupled with a transmission thereof. In certain embodiments, the drive system 110 may vary, and/or two or more drive systems 110 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

As noted above, in certain embodiments, the vehicle 100 includes one or more functions controlled automatically via the control system 102. In certain embodiments, the vehicle 100 comprises an autonomous vehicle, such as a semi-autonomous vehicle or a fully autonomous vehicle, for automated control of the drive system 110 and/or other vehicle components. However, this may vary in other embodiments, for example in which a human driver may control the drive system 110 and/or other vehicle components (e.g., in which the control system 102 may provide instructions or suggestions to the vehicle driver for recommended vehicle actions).

As depicted in FIG. 1, the vehicle also includes a braking system 106 and a steering system 108 in various embodiments. In exemplary embodiments, the braking system 106 controls braking of the vehicle 100 using braking components that are controlled via inputs provided by a driver (e.g., via a braking pedal in certain embodiments) and/or automatically via the control system 102. Also in exemplary embodiments, the steering system 108 controls steering of the vehicle 100 via steering components (e.g., a steering column coupled to the axles 114 and/or the wheels 112) that are controlled via inputs provided by a driver (e.g., via a steering wheel in certain embodiments) and/or automatically via the control system 102.

In the embodiment depicted in FIG. 1, the control system 102 is coupled to the braking system 106, the steering system 108, and the drive system 110. Also as depicted in FIG. 1, in various embodiments, the control system 102 includes a sensor array 120, a location system 130, a transceiver 135, a display 137, and a controller 140.

In various embodiments, the sensor array 120 includes various sensors that obtain sensor data for obtaining information maintaining movement of the vehicle 100 as well as other vehicles on the roadway in which the vehicle 100 is travelling, and also that detect sirens of emergency vehicles on the roadway and assist the control system 102 in planning (and in some embodiments executing) pull over actions for the vehicle 100 when an emergency vehicle is detected.

In the depicted embodiment, the sensor array 120 includes one or more microphones 121, cameras 122, other detection sensors 123, speed sensors 124, and accelerometers 125. It will be appreciated that in certain embodiments the sensor array 120 may also contain any number of other sensors.

In certain embodiments, the microphones 121 comprise an array of microphones 121 on various parts of the vehicle 100. In certain embodiments, the vehicle 100 has four microphones 121 disposed and/or mounted on various points around an exterior of the vehicle 100. In various embodiments, the microphones 121 are configured to detect sirens of emergency vehicles (e.g., police vehicles, firetrucks, ambulances, and the like) that are on or proximate the roadway in which the vehicle 100 is travelling.

Also in various embodiments, the cameras 122 include a plurality of cameras 122 that are also disposed and/or mounted on various points around an exterior of the vehicle 100. In various embodiments, the cameras 122 are configured to capture images of the roadway on which the vehicle 100 is travelling, including lanes, stop signs, traffic signals, junctions, other infrastructure, open spaces, emergency vehicles, and other vehicles and other objects along or in proximity to the roadway. In certain embodiments still camera images are obtained. In various embodiments, video camera images are also obtained.

Also in various embodiments, the other detection sensors 123 include a plurality of different other detection sensors 123, such as radar, sonar, LIDAR, and the like. In various embodiments, the other detection sensors 123 are also disposed and/or mounted on various points around an exterior of the vehicle 100. In various embodiments, the other detection sensors 123 are configured to detect emergency vehicles, other vehicles, traffic, and other objects on or in proximity to the roadway.

In various embodiments, the speed sensors 124 detect or measure a speed or velocity of the vehicle 100, and/or sensor data that can be utilized in calculating or determining the speed or velocity of the vehicle 100. In certain embodiments the speed sensors 124 comprise one or more wheel speed sensors that are coupled to one or more wheels 112 of the vehicle 100. However, in other embodiments, one or more other types of speed sensors may be utilized.

Also in various embodiments, the speed sensors 124 detect or measure a speed or velocity of the vehicle 100, and/or sensor data that can be utilized in calculating or determining the speed or velocity of the vehicle 100. In certain embodiments the speed sensors 124 comprise one or more wheel speed sensors that are coupled to one or more wheels 112 of the vehicle 100. However, in other embodiments, one or more other types of speed sensors may be utilized.

Also in various embodiments, the accelerometers 125 detect or measure an acceleration of the vehicle 100. It will be appreciated that in other embodiments one or more other sensors (such as speed sensors 124) may be utilized to determine acceleration, and so on.

Also in various embodiments, the location system 130 is configured to obtain and/or generate data as to a position and/or location in which the vehicle 100 is travelling. In certain embodiments, the location system 130 is also configured to obtain and/or generate data as to the position and/or location of the emergency vehicle(s) and/or other vehicles along the roadway. In certain embodiments, the location system 130 comprises and/or or is coupled to a satellite-based network and/or system, such as a global positioning system (GPS) and/or other satellite-based system.

In certain embodiments, the vehicle 100 also includes a transceiver 135. In various embodiments, the transceiver 135 receives information regarding traffic along the roadway, such as one or more emergency vehicles and/or other vehicles along the roadway, and/or information regarding stop signs, traffic lights, and/or other infrastructure on or associated with the roadway. In certain embodiments, the transceiver 135 receives information from and/or otherwise communicates with the emergency vehicles, other vehicles, and/or other entities (e.g., a traffic camera and/or other vehicle to infrastructure communications).

In various embodiments, the display 137 provides information or instructions for a driver and/or other occupants of the vehicle 100. In certain embodiments, the display 137 provides, among other possible information, instructions or recommendations for the driver as to how and/or where to pull over the vehicle 100 upon detection of an emergency vehicle on the roadway. In certain embodiments, the display 137 may provide a visual description on a display screen as to the direction to pull over, along with an indication marked on the display screen as to the preferred lane and location for pulling over. In certain other embodiments, one or more audio, haptic, and/or other notifications may also be provided.

In various embodiments, the controller 140 is coupled to the sensor array 120, the location system 130, the transceiver 135, and the display 137. Also in various embodiments, the controller 140 comprises a computer system (also referred to herein as computer system 140), and includes a processor 142, a memory 144, an interface 146, a storage device 148, and a computer bus 150. In various embodiments, the controller (or computer system) 140 plans vehicle actions (including pulling over of the vehicle 100 upon detection of an emergency vehicle) based on the sensor data obtained from the sensor array 120 and the location data obtained from the location system 130 (and, in various embodiments, also from data obtained via the transceiver 135). In certain embodiments, the controller 140 automatically executes the planned vehicle pullover, for example by automatically controlling vehicle actions such as via the braking system 106, steering system 108, and drive system 110. In certain other embodiments, the controller 140 provides instructions or recommendations via the display 137 for a human driver to execute the planned vehicle pullover. In various embodiments, the controller 140 provides these and other functions in accordance with the steps of the process 200 of FIGS. 3-6 and implementations of FIGS. 7-9 and as described further below in connection therewith.

In various embodiments, the controller 140 (and, in certain embodiments, the control system 102 itself) is disposed within the body 104 of the vehicle 100. In one embodiment, the control system 102 is mounted on the chassis 116. In certain embodiments, the controller 140 and/or control system 102 and/or one or more components thereof may be disposed outside the body 104, for example on a remote server, in the cloud, or other device where image processing is performed remotely.

It will be appreciated that the controller 140 may otherwise differ from the embodiment depicted in FIG. 1. For example, the controller 140 may be coupled to or may otherwise utilize one or more remote computer systems and/or other control systems, for example as part of one or more of the above-identified vehicle 100 devices and systems.

In the depicted embodiment, the computer system of the controller 140 includes a processor 142, a memory 144, an interface 146, a storage device 148, and a bus 150. The processor 142 performs the computation and control functions of the controller 140, and may comprise any type of processor or multiple processors, single integrated circuits such as a microprocessor, or any suitable number of integrated circuit devices and/or circuit boards working in cooperation to accomplish the functions of a processing unit. During operation, the processor 142 executes one or more programs 152 contained within the memory 144 and, as such, controls the general operation of the controller 140 and the computer system of the controller 140, generally in executing the processes described herein, such as the process 200 of FIGS. 3-6 and implementations of FIGS. 7-9 and as described further below in connection therewith.

The memory 144 can be any type of suitable memory. For example, the memory 144 may include various types of dynamic random access memory (DRAM) such as SDRAM, the various types of static RAM (SRAM), and the various types of non-volatile memory (PROM, EPROM, and flash). In certain examples, the memory 144 is located on and/or co-located on the same computer chip as the processor 142. In the depicted embodiment, the memory 144 stores the above-referenced program 152 along with map data 154 (e.g., from and/or used in connection with the location system 130 and/or transceiver 135) and one or more stored values 156 (e.g., including, in various embodiments, threshold values with respect to avoiding contact with the emergency vehicles and other vehicles during the vehicle pullover action).

The bus 150 serves to transmit programs, data, status and other information or signals between the various components of the computer system of the controller 140. The interface 146 allows communication to the computer system of the controller 140, for example from a system driver and/or another computer system, and can be implemented using any suitable method and apparatus. In one embodiment, the interface 146 obtains the various data from the sensor array 120 and/or the location system 130. The interface 146 can include one or more network interfaces to communicate with other systems or components. The interface 146 may also include one or more network interfaces to communicate with technicians, and/or one or more storage interfaces to connect to storage apparatuses, such as the storage device 148.

The storage device 148 can be any suitable type of storage apparatus, including various different types of direct access storage and/or other memory devices. In one exemplary embodiment, the storage device 148 comprises a program product from which memory 144 can receive a program 152 that executes one or more embodiments of the process 200 of FIGS. 3-6 and implementations of FIGS. 7-9 and as described further below in connection therewith. In another exemplary embodiment, the program product may be directly stored in and/or otherwise accessed by the memory 144 and/or a disk (e.g., disk 157), such as that referenced below.

The bus 150 can be any suitable physical or logical means of connecting computer systems and components. This includes, but is not limited to, direct hard-wired connections, fiber optics, infrared and wireless bus technologies. During operation, the program 152 is stored in the memory 144 and executed by the processor 142.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 142) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 140 may also otherwise differ from the embodiment depicted in FIG. 1, for example in that the computer system of the controller 140 may be coupled to or may otherwise utilize one or more remote computer systems and/or other control systems.

Figure 2:
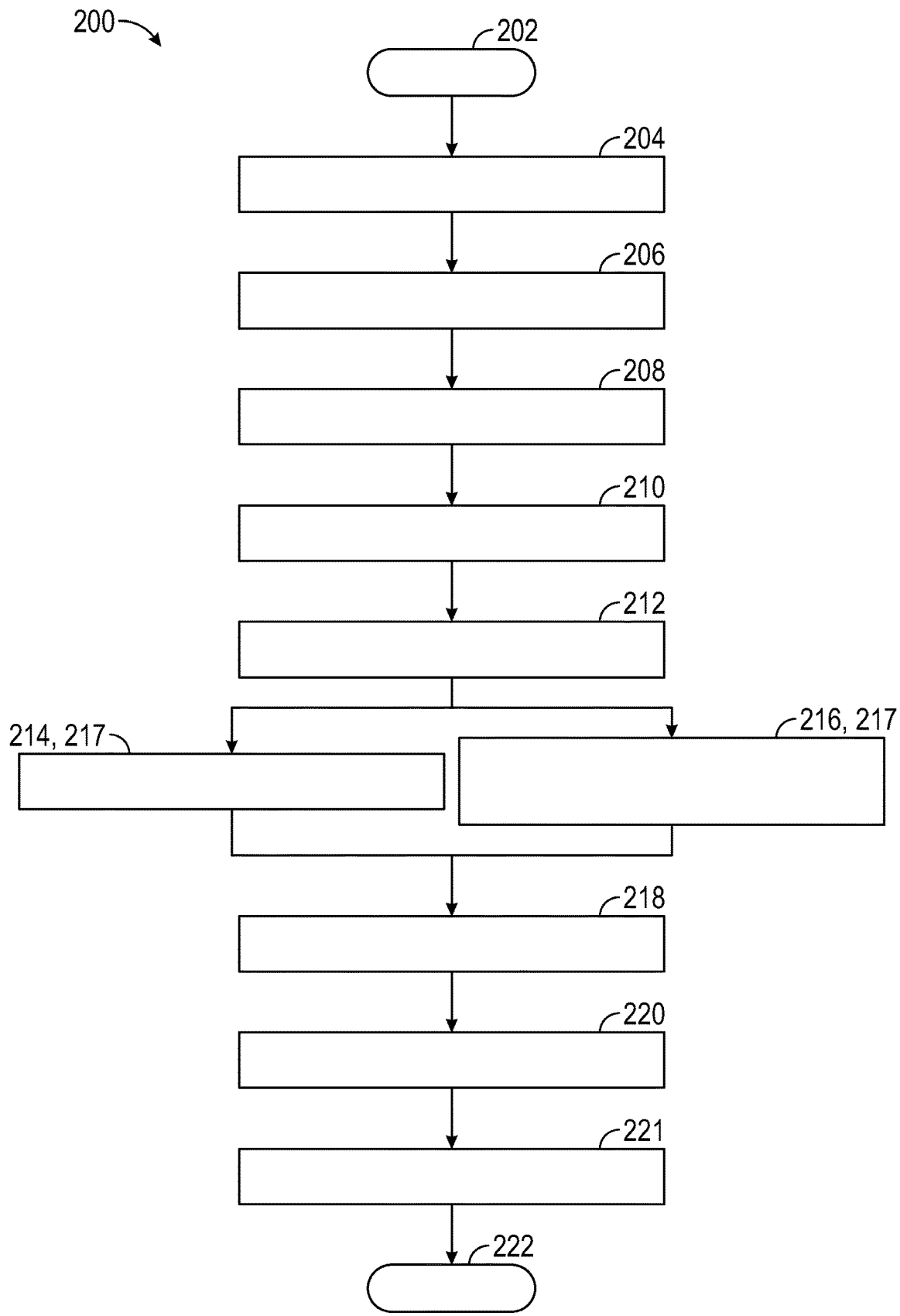
FIG. 2 is a flowchart of a process for controlling vehicle pull over events upon detection of an emergency vehicle, in accordance with exemplary embodiments, and that can be implemented in connection with the vehicle of FIG. 1, in accordance with exemplary embodiments.

With reference to FIG. 2, a flowchart is provided of a process 200 for controlling vehicle pull over events upon detection of an emergency vehicle, in accordance with exemplary embodiments. In various embodiments, the process 200 can be implemented in connection with the vehicle 100 of FIG. 1, including the control system 102 thereof. The process 200 is described below in connection with FIG. 2 as well as FIGS. 3-6 (which depict exemplary steps of the process 200 of FIG. 2 in greater detail) as well as FIGS. 7-9 (which depict exemplary implementations of the process 200).

As depicted in FIG. 2, the process 200 begins at step 202. In one embodiment, the process 200 begins when a vehicle drive or ignition cycle begins, for example when a driver or other user approaches or enters the vehicle 100, when the driver or other user turns on the vehicle and/or an ignition therefor (e.g. by turning a key, engaging a keyfob or start button, and so on), or when the vehicle begins operation (e.g., by a driver action for a driver-controlled vehicle or via the control system 102 in the case of autonomous vehicle). In one embodiment, the steps of the process 200 are performed continuously during operation of the vehicle.

In various embodiments, an emergency vehicle is detected (step 204). In various embodiments, the emergency vehicle is detected by detection of a siren of an emergency vehicle via one or more microphones 121 of FIG. 1. As noted above, in various embodiments, an emergency vehicle may comprise a police car, fire truck, ambulance, and/or one or more other types of emergency vehicles that require the host vehicle 100 and other vehicles to yield the right of way. In certain embodiments, the detection of the emergency vehicle may also be performed in whole or in part via data obtained from one or more other sources, such as one or more cameras 122 of the vehicle 100 and/or the transceiver 135 of the vehicle 100 (e.g., via communications with the emergency vehicle and/or other vehicles). For example, in certain embodiments, the siren of the emergency vehicle is initially detected via the microphones 121, and the location of the emergency vehicle is then localized with additional information, such as from the microphones, cameras 122, and/or transceivers 135.

In various embodiments, cell localization is performed (step 206). In various embodiments, localization is performed of a plurality of different cells, each representing a different potential location to which the vehicle 100 may pull over in order to yield the right of way to the emergency vehicle. Also in various embodiments, a grid is generated of the different cells, for prioritization in accordance with the additional steps described further below. In various embodiments, this is performed by the processor 142 of FIG. 1, using map data 154 and location information from the location system 130 of FIG. 1, among other possible data and information.

Figure 3:
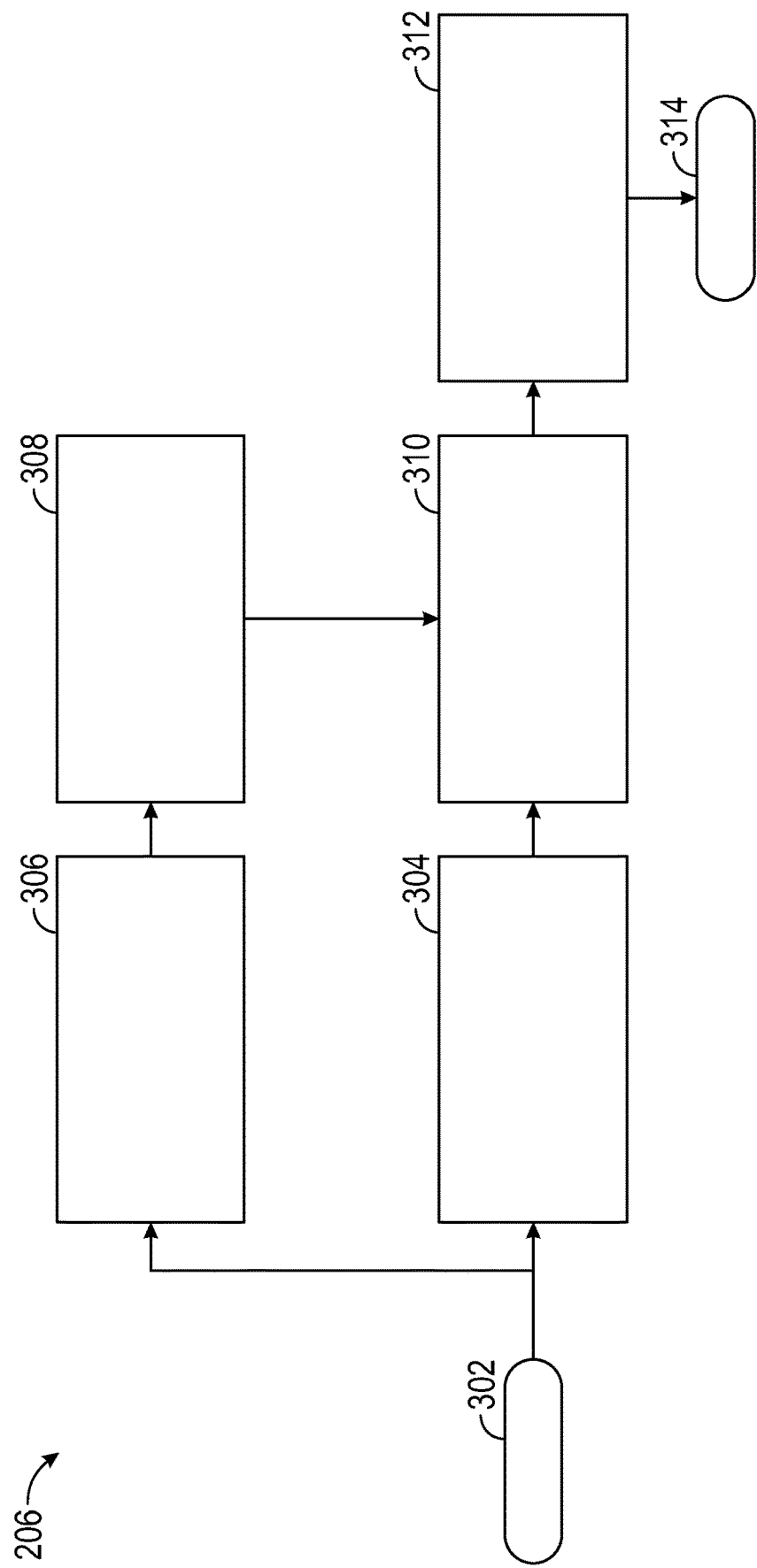
FIG. 3 is a flowchart of a an exemplary step of the process of FIG. 2, namely, cell localization, in accordance with exemplary embodiments.

With reference to FIG. 3, a flowchart is provided with additional details for step 206 (cell localization) of FIG. 2, in accordance with an exemplary embodiment. As depicted in FIG. 3, in an exemplary embodiment, the localization begins at step 302.

In various embodiments, map information is utilized for initial cell localization (step 304). Specifically, in various embodiments, map information (such as the map data 154 of FIG. 1) is utilized in combination with vehicle dimension information for the host vehicle 100 (which, for example, may also be stored in the memory 144 of FIG. 1) in order to provide the initial localization of the cells on the map. In various embodiments, this is performed by a processor, such as the processor 142 of FIG. 1.

Also in various embodiments, camera data is utilized to supplement the localization with a vision-based approach (steps 306 and 308). Specifically, in various embodiments, during step 306, camera data (e.g., including video camera data from the cameras 122 of FIG. 1 in an exemplary embodiment) is utilized to determine regular license plate dimensions for the vehicle. In various embodiments, this is performed by a processor (such as the processor 142) for the vehicle 100. In certain embodiments, this may also be performed for one or more other vehicles on the roadway.

Also in various embodiments, during step 308, the camera data is further utilized in determining the grid locations. Specifically, in certain embodiments, a processor (such as the processor 142 of FIG. 1) utilizes the host vehicle 100 reference as the focal length to determine the grid locations on the map. For example, in certain embodiments, the license plate dimensions of the host vehicle 100 are utilized for specific geographic locations for the grid locations (or positions) for the cells on the map.

In various embodiments, the map information and vision-based camera information are combined (step 310). Specifically, in various embodiments, a processor (such as the processor 142 of FIG. 1) cross-references the initial map information of step 304 with camera-based cell determinations of steps 306 and 308. In certain embodiments, the processor 142 uses the map data to determine the accuracy of the license plate-based cell determinations during step 310, in performing the following: (i) utilizing cell locations using the camera data; (ii) calibrating the camera-based approach; and (iii) discarding camera cell locations.

In various embodiments, cell localization is finalized (step 312). In various embodiments, a processor (such as the processor 142 of FIG. 10 finalizes the cell locations on the map (of possible locations to which the vehicle 100 may pull over to yield the right of way to the emergency vehicle) using both the map data and the camera data, including the results of step 310 (described above). In various embodiments, the cell localized is stored in the memory 144 of FIG. 1 for further use by the processor 142 of FIG. 1 (for example as described further below). In various embodiments, step 206 then terminates at step 314, and the process returns to FIG. 2 with step 208, described below.

With reference back to FIG. 2, in various embodiments, cells are analyzed with respect to road rules during step 208.

In various embodiments, for each cell "$c_i$", a probability is determined for each cell as to whether the vehicle 100 is likely to be successful in following road rules in order to reach the cell "$c_i$". In various embodiments, this probability of successfully achieving the particular cells while following the road rules is referred to herein as the "Road Rules Probability", and is designated as "$P_{rules}(c_i)$" for the particular cells. In various embodiments, this is performed by a processor, such as the processor 142 of FIG. 1.

With reference to FIG. 4, a flowchart is provided with additional details for step 208 (determining the probability of successfully achieving particular cells while following road rules) of FIG. 2, in accordance with an exemplary embodiment. As depicted in FIG. 4, in an exemplary embodiment, the determination of the road rules probability begins at step 402.

In various embodiments, map information is obtained (step 404). In various embodiments, map information (such as the map data 154 of FIG. 1) is obtained with respect to the roadway on which the host vehicle 100 is travelling.

Also in various embodiments, vision and location data are obtained (step 406). In various embodiments, camera data (e.g., including video camera data) is obtained from the cameras 122 of FIG. 1. Also in various embodiments, location data (e.g., including specific geographic coordinates of the vehicle 100 and the roadway) is obtained via the location system 130 of FIG. 1 (e.g., utilizing GPS data and/or other satellite-based data, and/or in certain embodiments using the transceiver 135 of FIG. 1 with data obtained from other vehicles, roadway infrastructure, and the like).

Also in various embodiments, the vision data (e.g., camera data) and location data (e.g., GPS) data are overlayed onto the map data (step 408). In various embodiments, this is performed by a processor (such as the processor 142 of FIG. 1).

Also in various embodiments, road conditions are identified (step 410). In various embodiments, road conditions may include stop signs, traffic lights, junctions, intersections, and lane markings for the roadway. Also in certain embodiments, the road conditions may also include lane curbs, obstacles, and other infrastructure and/or objects on or in proximity to the roadway. In addition, in certain embodiments, the road conditions may also include dynamic conditions of the roadway, such as the location and movement of other vehicles, traffic, colors of the traffic signals (e.g., red, yellow, or green), any barricades, cones, or other objects on the roadway, and/or weather conditions, and so on. In various embodiments, the identification is performed at least in part via the processor 142 of FIG. 1 for each cell ($c_i$) using the information of steps 404-408.

In various embodiments, cell elimination criteria are applied (step 412). Specifically, in various embodiments, the data and determinations of steps 404-410 are utilized in eliminating certain cells from consideration for the vehicle pull over action. Specifically, in various embodiments, certain specific cells ($c_i$) are eliminated from consideration as being a location for the vehicle 100 to pullover, when it is determined that it would not be feasible for the vehicle 100 to successfully reach the particular cells while following the rules and regulations of the roadway. In various embodiments, this is determined by a processor (such as the processor 142 of FIG. 1) using the data and determinations of steps 404-410, for example including determinations as to when the particular cell is located beyond a right light, whether particular cells are located within junctions or intersections, whether the particular cells are located beyond lane restriction markers (e.g., beyond double yellow or double white lane markers), and so on.

Also in various embodiments, cell disfavoring criteria is also applied (step 414). Specifically, in various embodiments, the data and determinations of steps 404-410 are utilized in disfavoring certain cells from consideration for the vehicle pull over action. As opposed to step 412, "disfavored" cells of step 414 may still be considered for the vehicle pull over action, but are given less priority as compared with other potential cells that are not disfavored. In certain embodiments, certain specific cells ($c_i$) are disfavored as being a location for the vehicle 100 to pullover, when it is determined that it may be difficult for the vehicle 100 to successfully reach the particular cells while following the rules and regulations of the roadway. In various embodiments, this is determined by a processor (such as the processor 142 of FIG. 1) using the data and determinations of steps 404-410, for example including determinations as to when the particular cell is located beyond a stop sign, or on top of a hill, or near fire hydrants, or as part of a bidirectional lane, and so on.

In various embodiments, the Road Rules Probability, "$P_{rules}(c_i)$", is calculated for each of the cells (step 416). In various embodiments, a processor (such as the processor 142 of FIG. 1) calculates the Road Rules Probability "$P_{rules}(c_i)$" based on the data of steps 404-414, and including the determinations of steps 412 and 414. Specifically, in various embodiments, the processor 142 calculates the Road Rules Probability "$P_{rules}(c_i)$" for each cell "$c_i$" as the probability that the vehicle 100 can reach the particular cell "$c_i$" during the pull over event while following the rules and regulations of the roadway.

In various embodiments, during step 416, the Road Rules Probability "$P_{rules}(c_i)$" for a particular cell "$c_i$" is assigned a value of one (1) if it is determined that there are no road conditions that are likely to impair the vehicle 100's ability to reach the particular cell "$c_i$" during the pull over event while following the rules and regulations of the roadway. In other words, in various embodiments, the Road Rules Probability "$P_{rules}(c_i)$" is assigned a value of one (1) for a particular cell "$c_i$" if the particular cell "$c_i$" is neither eliminated in step 412 nor disfavored in step 414.

Also in various embodiments during step 416, the Road Rules Probability "$P_{rules}(c_i)$" for a particular cell "$c_i$" is assigned a value of one half (0.5) if it is determined that there are one or more road conditions that are likely to impair, but not necessarily prevent, the vehicle 100's ability to reach the particular cell "$c_i$" during the pull over event while following the rules and regulations of the roadway. In other words, in various embodiments, the Road Rules Probability "$P_{rules}(c_i)$" is assigned a value of one half (0.5) for a particular cell "$c_i$" if the particular cell "$c_i$" is disfavored in step 414.

In addition, in various embodiments during step 416, the Road Rules Probability "$P_{rules}(c_i)$" for a particular cell "$c_i$" is assigned a value of zero (0) if it is determined that there are one or more road conditions that are likely to prevent the vehicle 100's ability to reach the particular cell "$c_i$" during the pull over event while following the rules and regulations of the roadway. In other words, in various embodiments, the Road Rules Probability "$P_{rules}(c_i)$" is assigned a value of zero (0) for a particular cell "$c_i$" if the particular cell "$c_i$" is eliminated in step 412. In various embodiments, step 210 then terminates at step 418, and the process returns to FIG. 2 with step 210, described below.

With reference back to FIG. 2, in various embodiments, cells are analyzed with respect to following traffic during step 210. In various embodiments, for each cell "$c_i$", a probability is determined for each cell as to whether the vehicle 100 is likely to be successful in following traffic to reach the cell "$c_i$". In various embodiments, this probability of successfully achieving the particular cells while following traffic is referred to herein as the "Following Traffic Probability", and is designated as "$P_{traffic}(c_i)$" for the particular cells. In various embodiments, this is performed by a processor, such as the processor 142 of FIG. 1.

With reference to FIG. 5, a flowchart is provided with additional details for step 210 (determining the probability of successfully achieving particular cells while following traffic) of FIG. 2, in accordance with an exemplary embodiment. As depicted in FIG. 5, in an exemplary embodiment, the determination of the following traffic probability begins at step 502.

In various embodiments, a traffic flow direction is determined (step 504). In various lanes a traffic flow direction is determined for the lane in which the vehicle 100 is travelling as well as for adjacent and other nearby lanes of the roadway. Also in various embodiments the traffic flow is determined via a processor (such as the processor 142 of FIG. 1) using vision and location data (e.g. from the cameras 122, other detection sensors 123, and location system 130) as well as from crowd sourcing and/or other data from other vehicles and/or from other third party sources that may include traffic services or the like (e.g., via the transceiver 135 of FIG. 1). In various embodiments, as referred to herein, the "direction" of traffic refers to whether traffic in proximity to the vehicle 100 are moving to the left, right, straight, or stopping (e.g., an immediate stop). In certain embodiments, the "direction" of traffic for any particular lanes refers to the traffic in those lanes that are in front of the host vehicle 100 (e.g., immediately in front of the host vehicle 100 and other nearby vehicles, in various embodiments).

Also in various embodiments, the lanes are classified (step 506). In various embodiments, the lanes of the roadway are classified based on the traffic flow direction of each of the lanes as determined in step 504. In various embodiments, during step 506, each of the lanes of the roadway are classified into one of the following categories, namely: (i) "in direction" of the crowd sourced traffic flow (i.e., which would make this lane a desirable lane for the vehicle 100 to utilize for the pull over event, at least in terms of direction); (ii) "in opposite direction" of the crowd sourced traffic flow (i.e., which would make this lane an undesirable lane for the vehicle 100 to utilize for the pull over event, at least in terms of direction); and (iii) "in neutral direction" of the crowd sourced traffic flow (i.e., which would make this lane in between the other two categories with respect to its desirability for the vehicle 100 to utilize for the pull over event, at least in terms of direction). In various embodiments, these determinations are made via a processor (such as the processor 142 of FIG. 1).

Also in various embodiments, the "Following Traffic Probability", or "$P_{traffic}(c_i)$" is calculated (step 508). In various embodiments, a processor (such as the processor 142 of FIG. 1) calculates the Following Traffic Probability "$P_{traffic}(c_i)$" based on the data of the determinations of steps 504-506. Specifically, in various embodiments, the processor 142 calculates the Following Traffic Probability "$P_{traffic}(c_i)$" for each cell "$c_i$" as the probability that the vehicle 100 can reach the particular cell "$c_i$" while successfully following the traffic (including the traffic patterns of the lanes) during the pull over event.

In various embodiments, during step 508, the Following Traffic Probability "$P_{traffic}(c_i)$" for a particular cell "$c_i$" is assigned a value of one (1) if it is determined that the lane "$c_i$" is in the direction of the crowdsourced traffic flow (e.g., that the lane "$c_i$" is desirable for the pull over event in terms of traffic flow).

Also in various embodiments, the Following Traffic Probability "$P_{traffic}(c_i)$" for a particular cell "$c_i$" is assigned a value of zero (0) if it is determined that the lane "$c_i$" is in the opposite direction of the crowdsourced traffic flow (e.g., that the lane "$c_i$" is undesirable for the pull over event in terms of traffic flow).

In addition, in various embodiments, the Following Traffic Probability "$P_{traffic}(c_i)$" for a particular cell "$c_i$" is assigned a value of one half (0.5) if it is determined that the lane "$c_i$" is in a neutral direction with respect to the crowdsourced traffic flow (e.g., that the desirability of the lane "$c_i$" from a traffic flow perspective is in between the other two categories).

In various embodiments, step 210 then terminates at step 510, and the process returns to FIG. 2 with step 212, described below.

With reference back to FIG. 2, in various embodiments, cells are analyzed with respect to vehicle dynamics during step 212. In various embodiments, for each cell "$c_i$", a probability is determined for each cell as to whether the vehicle 100 is likely to be successful to reach the cell "$c_i$" with respect to vehicle dynamics constraints. In various embodiments, this probability of successfully achieving the particular cells considering the vehicle dynamics constraints is referred to herein as the "Vehicle Dynamics Probability", and is designated as "$P_{VD}(c_i)$" for the particular cells. In various embodiments, this is performed by a processor, such as the processor 142 of FIG. 1.

In various embodiments, during step 212, the "Vehicle Dynamics Probability" or "$P_{VD}(c_i)$" is calculated based on various factors, including: (i) the wheel base of the host vehicle 100; (ii) the radius ("$R_k$") of each segment "k" of the road required for the vehicle to travel to the particular cell ($c_i$) to pull over; (iii) the heading ("$\theta_k$") of each segment "k" of the road required for the vehicle to travel to the particular cell ($c_i$) to pull over; (iv) the length "$d_k$" of each segment "k" of the road required for the vehicle to travel to the particular cell ($c_i$) to pull over; (v) the number ("n") of segments "k" of the road required for the vehicle to travel to the particular cell ($c_i$) to pull over; and (vi) the minimum feasible distance ("$d_{min}$") to reach the particular cell ($c_i$) to pull over.

In various embodiments, the following equation is utilized in calculating the "Vehicle Dynamics Probability" or "$P_{VD}(c_i)$":

$$P_{vd}(c_i)=1/n\Sigma(k=1,n)[1/(1+\text{sign}(R_k-\text{wheelbase}/\theta_k)]+ [1-\text{sign}(d_{min}-\Sigma(k=1,n)d_k] \quad \text{(Equation 1)},$$

with the symbols and notations identified above. In various embodiments, the use of this Equation 1 ensures that: (i) the required steering effort to reach the particular cell ($c_i$) is feasible (e.g., including that the radius "$R_k$" of the segment "k" required to travel to the particular cell ($c_i$) is greater than the minimum steering angle for the host vehicle 100); and (ii) that the distance "$d_k$" required to travel to the particular cell ($c_i$) is achievable (e.g., such that the distance is not too far to make travel there difficult, but not too close so as to fail to make room for the emergency vehicle).

With continued reference to FIG. 2, in various embodiments, cells are also analyzed with respect to possible contact between the host vehicle 100 and other vehicles (step 214). In various embodiments, for each cell "$c_i$", a probability is determined for each cell as to whether the vehicle 100 is likely to be successful to reach the cell "$c_i$" without contacting one or more other vehicles. In various embodiments, this probability of successfully achieving the particular cells without contacting other vehicles is referred to herein as the "Vehicle Contact Probability", and is designated as "$P_{col}(c_i)$" for the particular cells "$c_i$". In various embodiments, this is performed by a processor, such as the processor 142 of FIG. 1.

In addition, also with reference to FIG. 2, in various embodiments, cells are also analyzed with respect to possible contact between the host vehicle 100 and other vehicles (step 214). In various embodiments, for each cell "$c_i$", a probability is determined for each cell as to whether the vehicle 100 is likely to be successful to reach the cell "$c_i$" without the emergency vehicle being located in the cell "$c_i$". In various embodiments, this probability of successfully achieving the particular cells without the emergency vehicle being located within the cell is referred to herein as the "Emergency Vehicle Presence Probability", and is designated as "$P_{ev}(c_i)$" for the particular cells "$c_i$". In various embodiments, this is performed by a processor, such as the processor 142 of FIG. 1.

As depicted in FIG. 2, in certain embodiments steps 214 and 216 may be conducted jointly and/or considered as a joint step 217.

With reference to FIG. 6, a flowchart is provided with respect to this joint step 217, including step 214 (i.e., determining the "Vehicle Contact Probability" or "$P_{col}(c_i)$") as well as step 216 (i.e., determining the "Emergency Vehicle Presence Probability" for "$P_{ev}(c_i)$") for the particular cells "$c_i$". As depicted in FIG. 6, in an exemplary embodiment, these determinations begin at step 602.

In various embodiments, other vehicles are detected (step 604). Specifically, in various embodiments, other vehicles are detected that are in proximity to the host vehicle 100 on the roadway. In various embodiments, for each particular cell ($c_i$), detection is performed as to any surrounding vehicles that may occupy cell ($c_i$) at a particular time (t) during which the pull over event is likely to occur. In various embodiments, this is performed via the cameras 122 and other detection sensors 123 of FIG. 1 (e.g., via vision sensing), and in certain embodiments also via the transceiver 135 (e.g., in the case of vehicle to vehicle communications, vehicle to infrastructure communications, and so on). In certain embodiments, determinations as to which other vehicles are likely to occupy cell ($c_i$) at a particular time (t) may also be made by a processor (such as the processor 142 of FIG. 1) using this data.

Also in various embodiments, one or more emergency vehicles are also detected and localized (step 606). Specifically, in various embodiments, an emergency vehicle is detected that are in proximity to the host vehicle 100 on the roadway (and, in particular, for which the microphones 121 have detected a siren. In various embodiments, for each particular cell ($c_i$), detection and localized is performed as to whether the emergency vehicle may occupy cell ($c_i$) at a particular time (t) during which the pull over event is likely to occur. In various embodiments, this is performed via the cameras 122 and other detection sensors 123 of FIG. 1 (e.g., via vision sensing), and in certain embodiments also via the transceiver 135 (e.g., in the case of vehicle to vehicle communications, vehicle to infrastructure communications, and so on). In certain embodiments, determinations as to whether the emergency vehicle is likely to occupy cell ($c_i$) at a particular time (t) may also be made by a processor (such as the processor 142 of FIG. 1) using this data.

Also in various embodiments, motion is predicted for the surrounding vehicles (step 608). Specifically, in various embodiments, the motion is predicted for the other vehicles detected in step 604, and an estimate is provided as to which of the other vehicles are likely to arrive at each particular cell ($c_i$), and at which particular time (t). In various embodiments, these predictions and estimates are performed by a processor (such as the processor 142 of FIG. 1) using the data and detection of step 604. In various embodiments, this is performed by the processor 142 in accordance with the following equation:

$$d = vt_{vehj} + \tfrac{1}{2}at_{vehj}^2 \qquad \text{(Equation 2)},$$

in which "d" refers to the distance travelled by the particular other vehicle ("$veh_j$"), "v" refers to the velocity of the particular other vehicle ("$veh_j$"), "a" refers to the acceleration of the particular other vehicle ("$veh_j$"), and $t_{vehj}$ refers to the time at which the particular other vehicle ("$veh_j$") is predicted to reach a particular cell ($c_i$) (also referred to as cell "i").

In addition, also in various embodiments, a determination is also made as to the time at which the host vehicle 100 is expected to reach cell (i) (step 610). Specifically, in various embodiments, this determination is made by a processor (such as the processor 142 of FIG. 1) based on sensor data from the host vehicle 100, in accordance with the following equation:

$$d = vt_{vehhost} + \tfrac{1}{2}at_{vehhost}^2 \qquad \text{(Equation 3)},$$

in which "d" refers to the distance travelled by the host vehicle 100 ("$veh_{host}$"), "v" refers to the velocity of the host vehicle 100 ("$veh_{host}$"), "a" refers to the acceleration of the host vehicle ("$veh_{host}$"), and $t_{vehhost}$ refers to the time at which the host vehicle 100 ("$veh_{host}$") is predicted to reach a particular cell ($c_i$) (also referred to as cell "i").

In addition, also in various embodiments, motion is predicted for the emergency vehicle (step 612). Specifically, in various embodiments, the motion is predicted for the emergency detected and localized in step 606, and an estimate is provided as to at what particular time (t) the emergency vehicle is likely to arrive at each particular cell ($c_i$), and. In various embodiments, these predictions and estimates are performed by a processor (such as the processor 142 of FIG. 1) using the data, detection, and localization of step 606. In various embodiments, this is performed by the processor 142 in accordance with the following equation:

$$d = vt_{vehj} + \tfrac{1}{2}at_{vehj}^2 \qquad \text{(Equation 4)},$$

in which "d" refers to the distance travelled by the emergency vehicle ("$veh_{ev}$"), "v" refers to the velocity of the emergency vehicle ("$veh_{ev}$"), "a" refers to the acceleration of the emergency vehicle ("$veh_{ev}$"), and $t_{ev}$ refers to the time at which the emergency vehicle ("$veh_{ev}$") is predicted to reach a particular cell ($c_i$) (also referred to as cell "i").

In various embodiments, the Vehicle Contact Probability is calculated (step 614). As noted above, in various embodiments, the Vehicle Contact Probability, or "$P_{col}(c_i)$", for any particular cell ($c_i$) refers to the probability that the host vehicle 100 will reach the particular cell ($c_i$) without contacting any other vehicles (for example as referred to above with respect to step 214). In various embodiments, the Vehicle Contact Probability or "$P_{col}(c_i)$" for each cell "$c_i$" is calculated by a processor (such as the processor 142 of FIG. 1) utilizing both the surrounding vehicle motion predictions of step 608 as well as the host vehicle's arrival time at cell "i" of step 610. In various embodiments, the Vehicle Contact Probability or "$P_{col}(c_i)$" for each cell "$c_i$" is calculated in accordance with the following equation:

$$P_{col}(c_i)=1/n\Sigma(j=1,n)*[|t_{vehhost}-t_{vehj}|]/[1+\text{sign}(|t_{vehhost}-t_{vehj}|-t_{safe})]$$ (Equation 5)

in which "tsafe" represents a constant value.

Also in various embodiments, the Emergency Vehicle Presence Probability is also calculated (step 616). As noted above, in various embodiments, the Emergency Vehicle Presence Probability, or "$P_{ev}(c_i)$", for each cell "$c_i$" represents the probability of successfully achieving the particular cell without the emergency vehicle being located within the cell "$c_i$" (for example as referred to above with respect to step 216). In various embodiments, the Emergency Vehicle Presence Probability, or "$P_{ev}(c_i)$" for each cell "$c_i$" is calculated by a processor (such as the processor 142 of FIG. 1) utilizing both the emergency vehicle motion predictions of step 612 as well as the host vehicle's arrival time at cell "i" of step 610. In various embodiments, the V Emergency Vehicle Presence Probability, or "$P_{ev}(c_i)$" for each cell "$c_i$" is calculated in accordance with the following equation:

$$P_{ev}(c_i)=1/n\Sigma(j=1,n)*[|t_{vehhost}-t_{vehej}|]/[1+\text{sign}(|t_{vehhost}-t_{vehej}|-t_{safe})]$$ (Equation 6), in which "tsafe" similarly represents a constant value.

In various embodiments, step 217 then terminates at step 622, and the process returns to FIG. 2 with step 218, described below.

With reference back to FIG. 2, in various embodiments, during step 218, aggregate probability values $F(c_i)$ are calculated for each cell ($c_i$). In various embodiments, for each cell, the aggregate probability value $F(c_i)$ is calculated by adding together each of the respective individual probability values of steps 208, 210, 212, 214, and 216 for each cell ($c_i$). In various embodiments, this is performed by a processor (such as the processor 142 of FIG. 1) in accordance with the following equation:

$$F(c_i)=P_{col}(c_i)+P_{vd}(c_i)+P_{traffic}(c_i)+P_{rules}(c_i)$$ (Equation 7), in which $P_{col}(c_i)$, $P_{vd}(c_i)$, $P_{traffic}(c_i)$, and $P_{rules}(c_i)$ represents the respective probabilities described above in connection with steps 208-216.

In certain embodiments, as part of step 218, the individual probabilities of $P_{col}(c_i)$, $P_{vd}(c_i)$, $P_{traffic}(c_i)$, and $P_{rules}(c_i)$ are each first normalized prior to summation of Equation 7, with the normalization of each respective probability ("P") performed by the processor 142 in accordance with the following equation:

$$\text{Normalized}(P)(c_i)=[P-\min(P)]/[\max P-\min P]$$ (Equation 8), in which "Normalized (P)(ci)" represents the normalized probability for a respective probability of one of the respective probability types of $P_{col}(c_i)$, $P_{vd}(c_i)$, $P_{traffic}(c_i)$, or $P_{rules}(c_i)$ for a respective cell ($c_i$); (ii) "min(P)" represents a minimum value for the respective probability type across all cells; and (iii) "max(P)" represents a maximum value for the respective probability type across all cells. In certain embodiments, these normalized probabilities always have a value between zero (0) and one (1). Also in certain embodiments, these normalized probabilities are then summed together to calculate $F(c_i)$ (similar to Equation 7), in accordance with the following equation:

$$F(c_i)=\text{Normalized } P_{col}(c_i)+\text{Normalized } P_{vd}(c_i)+\text{Normalized } P_{traffic}(c_i)+\text{Normalized } P_{rules}(c_i)$$ (Equation 9)

In various embodiments, an optimal pull-over location is determined (step 220). In various embodiments, during step 220, a processor (such as the processor 142 of FIG. 1) determines the optimal cell ($c_i$) to which the host vehicle 100 will pull over during the vehicle pull over action in order to yield the right of the way to the emergency vehicle.

In various embodiments, the determination of the optimal pull-over location (or cell) is made by a classification of each of the cells ($c_i$) based on their respective adjusted probability scores $F(c_i)$ of step 218. In various embodiments, this classification is made by a processor (such as the processor 142 of FIG. 1) in accordance with three categories; namely: (i) a first category of eliminated cells for cells ($c_i$) in which the adjusted probability score $F(c_i)$ is less than a first predetermined threshold; (ii) a second category of less desirable cells for cells ($c_i$) in which the adjusted probability score $F(c_i)$ is greater than the first predetermined threshold but less than a second predetermined threshold (wherein the second predetermined threshold is greater than the first predetermined threshold); and (iii) a third category of desirable cells for cells ($c_i$) in which the adjusted probability score $F(c_i)$ is greater than the second predetermined threshold.

In certain embodiments, when there are more than one "desirable cells" (i.e., in which the adjusted probability score $F(c_i)$ is greater than the second predetermined threshold), then the optimal pull-over location is selected as the one of the "desirable cells" that has the closest physical distance to the host vehicle 100. Similarly, in certain embodiments, when there is only a single "desirable cell", then this single "desirable cell" is selected as the optimal pull-over location.

Also in certain embodiments, when there are no "desirable cells" (i.e., in which the adjusted probability score $F(c_i)$ is greater than the second predetermined threshold) but there are more than one "less desirable cells", then the optimal pull-over location is selected as the one of the "less desirable cells" that has the closest physical distance to the host vehicle 100. Similarly, in certain embodiments, when there are no "desirable cells" and there is only a single "less desirable cell", then this single "less desirable cell" is selected as the optimal pull-over location.

In various embodiments, one or more vehicle actions are then taken (step 221).

In certain embodiments (e.g., in which a human driver is operating the vehicle), during step 221 the processor 142 of FIG. 1 provides information as to the desired pull-over location via instructions provided to the display 137 of FIG. 1. For example in certain embodiments, the processor 142 provides instructions that are executed by the display 137 to provide visual depiction of the desired pull over location (e.g., cell), for example as highlighted on a map of a display screen of the display 137. In certain embodiments, one or more other indications (e.g., audio and/or haptic) may also be provided for the driver in accordance with instructions provided by the processor 142.

In certain other embodiments (e.g., in an autonomous or semi-autonomous vehicle), during step 221 the processor 142 of FIG. 1 causes automatic movement of the vehicle 100 to the optimal pull over location (e.g., cell). In certain embodiments, the processor 142 provides instructions to one or more of the braking system 106 of FIG. 1, the steering system 108 of FIG. 1, the drive system 110 of FIG. 1, and/or one or more other vehicle systems of the vehicle 100 of FIG. 1 that execute the processor 142's instructions to automatically move the vehicle 100 to the optimal pull over location (e.g., cell) via a route that is selected by the processor 142.

In various embodiments, the process then 200 terminates at step 222.

Figure 7:
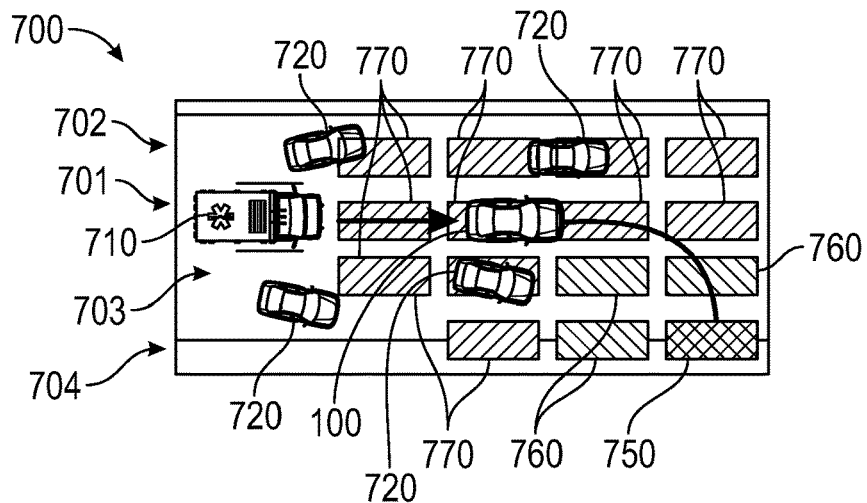
FIGS. 7-9 depict exemplary implementations of the process of FIGS. 2-6 on a roadway under certain conditions, in accordance with exemplary embodiments.
Figure 8:
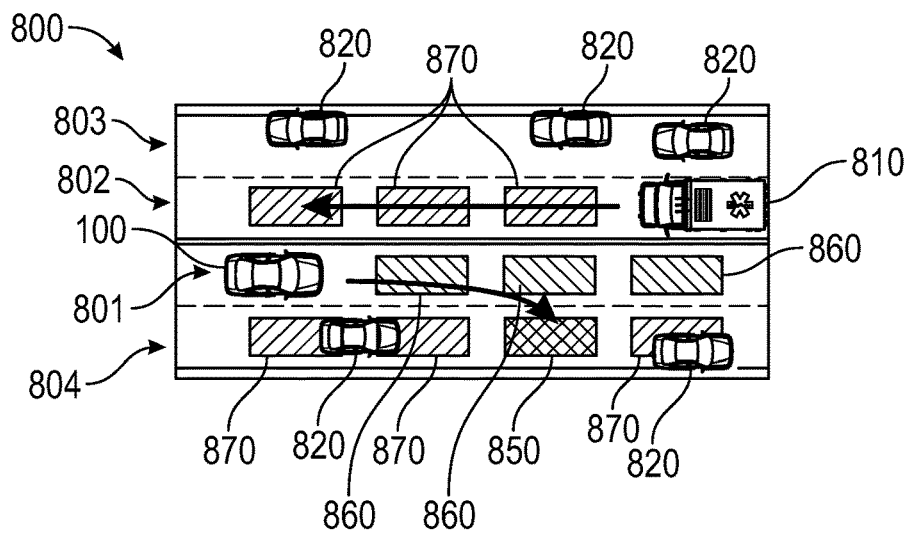
Figure 9:
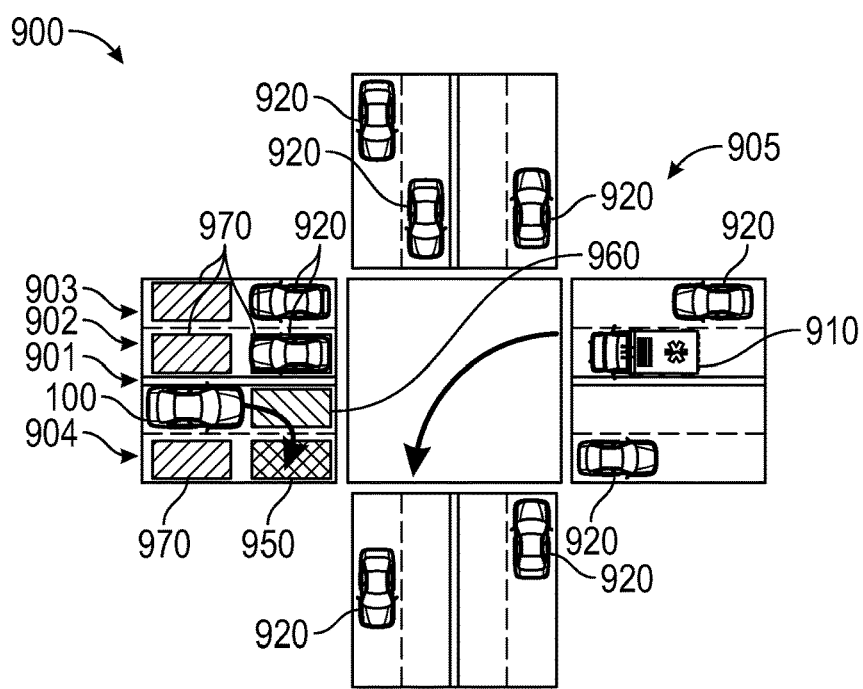

With reference to FIGS. 7-9, exemplary implementations are depicted of the process 200 of FIGS. 2-6, in accordance with exemplary embodiments on a roadway under certain exemplary conditions.

First, FIG. 7 depicts an illustration of a first exemplary implementation including a roadway 700 with three lanes of traffic in the same direction, in accordance with an exemplary embodiment. As depicted in FIG. 7, the host vehicle 100 and emergency vehicle 710 are both initially travelling in a first lane 701. The first lane is surrounded by a second lane 702 to the left of the first lane 701, as well as by a third lane 703 to the right of the first lane 701, in addition to a shoulder 704 that is to the right of the third lane 703.

In this particular example of FIG. 7, there is a single favorable cell 750 that is selected as the cell for the optimal pull over location for the vehicle 100 in order to yield the right of the way to the emergency vehicle 710 (for example because the aggregate probability value $F(c_i)$ of this cell 750 is greater than the second predetermined threshold of 218 of FIG. 2). Also as depicted in FIG. 7, in this example there are multiple eliminated cells 770 (e.g., for which contact with the emergency vehicle 710 and/or one or more other vehicles 720 may be likely, and/or in which the aggregate probabilities F(ci) are less than the first predetermined threshold of step 218 of FIG. 2. In addition, also as depicted in FIG. 7, in this example there are multiple less favored cells 760 (e.g., for which contact with the emergency vehicle 710 and/or one or more other vehicles 720 may have some moderate degree of possibility, and/or in which the aggregate probabilities F(ci) are greater than the first predetermined threshold but less than the second predetermined threshold of step 218 of FIG. 2.

Next, FIG. 8 depicts an illustration of a second exemplary implementation including a roadway 800 with traffic in different directions, including two lanes in each opposing direction, in accordance with an exemplary embodiment. As depicted in FIG. 8, the host vehicle 100 is initially travelling in a first lane 801 in a first direction, and the emergency vehicle 810 is initially travelling in a second lane 802 that is adjacent to, and with traffic in an opposite direction as, the first lane 801. As depicted in FIG. 8, in this example, the roadway 800 also includes a third lane 803 beyond (to the left of) the second lane 802 and with traffic travelling in the same direction as the second lane 802. In addition, also as depicted in FIG. 8, in this example the roadway 800 also includes a fourth lane 804 beyond (to the right of) the first lane 801 and with traffic travelling in the same direction as the first lane 801.

In this particular example of FIG. 8, there is a single favorable cell 850 that is selected as the cell for the optimal pull over location for the vehicle 100 in order to yield the right of the way to the emergency vehicle 810 (for example because the aggregate probability value $F(c_i)$ of this cell 850 is greater than the second predetermined threshold of 218 of FIG. 2). Also as depicted in FIG. 8, in this example there are multiple eliminated cells 870 (e.g., for which contact with the emergency vehicle 810 and/or one or more other vehicles 820 may be likely, and/or in which the aggregate probabilities F(ci) are less than the first predetermined threshold of step 218 of FIG. 2. In addition, also as depicted in FIG. 8, in this example there are multiple less favored cells 860 (e.g., for which contact with the emergency vehicle 810 and/or one or more other vehicles 820 may have some moderate degree of possibility, and/or in which the aggregate probabilities F(ci) are greater than the first predetermined threshold but less than the second predetermined threshold of step 218 of FIG. 2.

Next, FIG. 9 depicts an illustration of a second exemplary implementation including a roadway 900 with a junction 905, including four lanes (two lanes each in opposing directions) on each side of the four-way junction 905. As depicted in FIG. 9, in this example, the host vehicle 100 is initially travelling in a first lane 901 in a first direction, and the emergency vehicle 900 is initially travelling in a portion of a second lane 902 that is adjacent to, and with traffic in an opposite direction as, the first lane 901, and in an opposite side of the junction 905 as to the host vehicle 100. As depicted in FIG. 9, in this example, the roadway 900 also includes (among other lanes in perpendicular directions through the junction 905) a third lane 903 beyond (to the left of) the second lane 902 and with traffic travelling in the same direction as the second lane 902. In addition, also as depicted in FIG. 9, in this example the roadway 900 also includes a fourth lane 904 beyond (to the right of) the first lane 901 and with traffic travelling in the same direction as the first lane 901.

In this particular example of FIG. 9, there is a single favorable cell 950 that is selected as the cell for the optimal pull over location for the vehicle 100 in order to yield the right of the way to the emergency vehicle 910 (for example because the aggregate probability value $F(c_i)$ of this cell 950 is greater than the second predetermined threshold of 218 of FIG. 2). Also as depicted in FIG. 9, in this example there are multiple eliminated cells 970 (e.g., for which contact with the emergency vehicle 910 and/or one or more other vehicles 920 may be likely, including within the junction 905 itself, and/or in which the aggregate probabilities F(ci) are less than the first predetermined threshold of step 218 of FIG. 2. In addition, also as depicted in FIG. 9, in this example there are multiple less favored cells 960 (e.g., for which contact with the emergency vehicle 910 and/or one or more other vehicles 920 may have some moderate degree of possibility, and/or in which the aggregate probabilities F(ci) are greater than the first predetermined threshold but less than the second predetermined threshold of step 218 of FIG. 2.

Accordingly, methods, systems, and vehicles are provided for determining and executing an optimal pull over action for a vehicle in yielding the right of way to an emergency vehicle. In various embodiments, the pull over action is not determined to automatically be a nearby cell to the right of the host vehicle, but rather comprises a dynamic determination of the optimal pull over location based on an aggregate probability of each of a number of possible cells for vehicle pull over action, including probabilities with respect to road rules, following traffic, vehicle dynamics, possible contact with other vehicles, and possible location of the emergency vehicle within the particular cells.

In various embodiments, the techniques described herein may be used in connection with vehicles having a human driver, but that also have automatic functionality (e.g., adaptive cruise control). In various embodiments, the techniques described herein may also be used in connection autonomous vehicles, such as semi-autonomous and/or fully autonomous vehicles.

It will be appreciated that the systems, vehicles, and methods may vary from those depicted in the Figures and described herein. For example, the vehicle 100 of FIG. 1 and/or components thereof may differ from that depicted in FIG. 1. It will similarly be appreciated that the steps of the process 200 may differ from those depicted in FIGS. 2-6, and/or that various steps of the process 200 may occur concurrently and/or in a different order than that depicted in FIGS. 2-6. It will similarly be appreciated that the various implementation of FIGS. 7-9 may also differ in various embodiments.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method comprising:
   obtaining sensor data pertaining to a roadway in which a host vehicle and an emergencyvehicle are both travelling;
   generating, using map data pertaining to the roadway, a grid of a plurality of potential cells along the roadway for the host vehicle to pull over to yield right of way to the emergencyvehicle;
   prioritizing, via a processor of the host vehicle, the plurality of potential cells based on a plurality of different criteria as to conditions of the host vehicle and the roadway;
   selecting, via the processor, one of the plurality of potential cells as an optimal pull over location for the host vehicle along the roadway, based on the prioritizing of the plurality of cells; and
   taking a vehicle action for the host vehicle, in accordance with instructions provided by the processor, with respect to the optimal pull over location;
   wherein the steps of prioritizing the plurality of potential cells and selecting the optimal pull over location are both performed via the processor by calculating an arithmetic sum of different respective probabilities, each comprising different respective normalized probabilities between zero and one in value, for each potential cell as to each of the following:
      whether the host vehicle can successfully reach the potential cell while following road rules for the roadway;
      whether the host vehicle can successfully reach the potential cell while following traffic in front of the host vehicle;
      whether the host vehicle can successfully reach the potential cell while given vehicle dynamic constraints, wherein the probability of whether the host vehicle can successfully reach the potential cell while given vehicle dynamic constraints is determined, by the processor, based on a wheel base of the vehicle, radius of road required, a heading of road on the which the vehicle is travelling, a length of segments of the road, a number of segments on the road, and a minimum feasible distance for travel on the road;
      whether the host vehicle can successfully reach the potential cell without contacting any other vehicles on the roadway; and
      whether the host vehicle can successfully reach the potential cell without the emergency vehicle being in the potential cell.

2. The method of claim 1, wherein the step of taking the vehicle action comprises:
   automatically moving the host vehicle to the optimal pull over location in accordance with instructions provided by the processor to one or more vehicle systems of the host vehicle.

3. The method of claim 1, wherein the step of taking the vehicle action comprises:
   providing a display of the optimal pull over location for a driver of the host vehicle, via a display device of the host vehicle in accordance with instructions provided by the processor.

4. The method of claim 3, wherein the display comprises a map showing the optimal pull over location along with other possible pull over locations, with the optimal pull over location highlighted.

5. The method of claim 1, wherein:
   the step of obtaining sensor data comprises:
      obtaining microphone data from one or more microphones of the host vehicle; and
      obtaining vision data from one or more cameras of the host vehicle; and
   the method further comprises:
      detecting the emergency vehicle using the microphone data; and
      localizing the emergency vehicle using the vision data.

6. The method of claim 1, wherein the probability of whether the host vehicle can successfully reach the potential cell while following traffic in front of the host vehicle is determined, by the processor, based on a direction of traffic, a crowd-sourced traffic flow, and classification of lanes.

7. The method of claim 1, wherein the probabilities are normalized in accordance with the following equation:

$$\text{Normalized } (P)(c_i) = [P - \min(P)] / [\max P - \min P],$$

in which "Normalized (P)(ci)" represents the normalized probability for a respective probability of one of the respective probability types of $P_{col}(c_i)$, $P_{vd}(c_i)$, $P_{traffic}(C_i)$, or $P_{rules}(c_i)$ for a respective cell $(c_i)$; (ii) "min(P)" represents a minimum value for the respective probability type across all cells; and (iii) "max(P)" represents a maximum value for the respective probability type across all cells.

8. The method of claim 1, wherein the determination of the optimal pull over location is made by the processor by a classification of each of the cells $(c_i)$ based on respective adjusted probability scores $F(c_i)$.

9. The method of claim 8, wherein the classification is made by the processor in accordance with three categories; including: (i) a first category of eliminated cells for cells $(c_i)$ in which the adjusted probability score $F(c_i)$ is less than a first predetermined threshold; (ii) a second category of less desirable cells for cells $(c_i)$ in which the adjusted probability score $F(c_i)$ is greater than the first predetermined threshold but less than a second predetermined threshold (wherein the second predetermined threshold is greater than the first predetermined threshold); and (iii) a third category of desirable cells for cells $(c_i)$ in which the adjusted probability score $F(c_i)$ is greater than the second predetermined threshold.

10. A system comprising:
    one or more sensors configured to generate sensor data pertaining to a roadway in which a host vehicle and an emergency vehicle are both travelling; and
    a processor that is coupled to the one or more sensors and configured to at least facilitate:
       generating, using map data pertaining to the roadway, a grid of a plurality of potential cells along the roadway for the host vehicle to pull over to yield right of way to the emergency vehicle;

prioritizing the plurality of potential cells based on a plurality of different criteria as to conditions of the host vehicle and the roadway;

selecting one of the plurality of potential cells as an optimal pull over location for the host vehicle along the roadway, based on the prioritizing of the plurality of cells; and taking a vehicle action for the host vehicle, in accordance with instructions provided by the processor, with respect to the optimal pull over location;

wherein the processor is configured to at least facilitate prioritizing the plurality of potential cells and selecting the optimal pull over location by calculating an arithmetic sum of different respective probabilities, each comprising different respective normalized probabilities between zero and one in value, for each potential cell as to each of the following:

whether the host vehicle can successfully reach the potential cell while following road rules for the roadway;

whether the host vehicle can successfully reach the potential cell while following traffic in front of the host vehicle;

whether the host vehicle can successfully reach the potential cell while given vehicle dynamic constraints, wherein the probability of whether the host vehicle can successfully reach the potential cell while given vehicle dynamic constraints is determined, by the processor, based on a wheel base of the vehicle, radius of road required, a heading of road on the which the vehicle is travelling, a length of segments of the road, a number of segments on the road, and a minimum feasible distance for travel on the road;

whether the host vehicle can successfully reach the potential cell without contacting any other vehicles on the roadway; and whether the host vehicle can successfully reach the potential cell without the emergency vehicle being in the potential cell.

11. The system of claim 10, wherein the processor is further configured to at least facilitate:

automatically moving the host vehicle to the optimal pull over location in accordance with instructions provided by the processor to one or more vehicle systems of the host vehicle.

12. The system of claim 10, wherein the processor is further configured to at least facilitate:

providing a display of the optimal pull over location for a driver of the host vehicle, via a display device of the host vehicle in accordance with instructions provided by the processor.

13. The system of claim 12, wherein the display comprises a map showing the optimal pull over location along with other possible pull over locations, with the optimal pull over location highlighted.

14. The system of claim 10, wherein:

the one or more sensors comprise:

one or more microphones configured to generate microphone data; and one or more cameras configured to generate vision data; and the processor is further configured to at least facilitate:

detecting the emergency vehicle using the microphone data; and localizing the emergency vehicle using the vision data.

15. The system of claim 10, wherein the processor is configured to determine the probability of whether the host vehicle can successfully reach the potential cell while following traffic in front of the host vehicle based on a direction of traffic, a crowd-sourced traffic flow, and classification of lanes.

16. The system of claim 10, wherein the processor is configured to normalize the probabilities in accordance with the following equation:

Normalized $(P)(c_i) = [P - \min(P)] / [\max P - \min P]$, in which "Normalized (P)(ci)" represents the normalized probability for a respective probability of one of the respective probability types of $P_{col}(c_i)$, $P_{vd}(c_i)$, $P_{traffic}(C_i)$, or $P_{rules}(c_i)$ for a respective cell $(c_i)$; (ii) "min(P)" represents a minimum value for the respective probability type across all cells; and (iii) "max(P)" represents a maximum value for the respective probability type across all cells.

17. The system of claim 10, wherein the processor is configured to determine the optimal pull over location by a classification of each of the cells $(c_i)$ based on respective adjusted probability scores $F(c_i)$, wherein the classification is made by the processor in accordance with three categories; including: (i) a first category of eliminated cells for cells $(c_i)$ in which the adjusted probability score $F(c_i)$ is less than a first predetermined threshold; (ii) a second category of less desirable cells for cells $(c_i)$ in which the adjusted probability score $F(c_i)$ is greater than the first predetermined threshold but less than a second predetermined threshold (wherein the second predetermined threshold is greater than the first predetermined threshold); and (iii) a third category of desirable cells for cells $(c_i)$ in which the adjusted probability score $F(c_i)$ is greater than the second predetermined threshold.

18. A vehicle comprising:

a body;

a propulsion system configured to generate movement of the body;

one or more sensors configured to generate sensor data pertaining to a roadway in which a host vehicle and an emergencyvehicle are both travelling; and a processor that is coupled to the one or more sensors and configured to at least facilitate:

generating, using map data pertaining to the roadway, a grid of a plurality of potential cells along the roadway for the host vehicle to pull over to yield right of way to the emergencyvehicle;

prioritizing the plurality of potential cells based on a plurality of different criteria as to conditions of the host vehicle and the roadway;

selecting one of the plurality of potential cells as an optimal pull over location for the host vehicle along the roadway, based on the prioritizing of the plurality of cells; and taking a vehicle action for the host vehicle, in accordance with instructions provided by the processor, with respect to movement of the body of the host vehicle the optimal pull over location;

wherein the processor is configured to at least facilitate prioritizing the plurality of potential cells and selecting the optimal pull over location by calculating an arithmetic sum of different respective probabilities, each comprising different respective normalized probabilities between zero and one in value, for each potential cell as to each of the following:

whether the host vehicle can successfully reach the potential cell while following road rules for the roadway;

whether the host vehicle can successfully reach the potential cell while following traffic in front of the host vehicle;

whether the host vehicle can successfully reach the potential cell while given vehicle dynamic constraints, wherein the probability of whether the host vehicle can successfully reach the potential cell while given vehicle dynamic constraints is determined, by the processor, based on a wheel base of the vehicle, radius of road required, a heading of road on the which the vehicle is travelling, a length of segments of the road, a number of segments on the road, and a minimum feasible distance for travel on the road;

whether the host vehicle can successfully reach the potential cell without contacting any other vehicles on the roadway; and whether the host vehicle can successfully reach the potential cell without the emergency vehicle being in the potential cell.

\* \* \* \* \*